Figure 5:
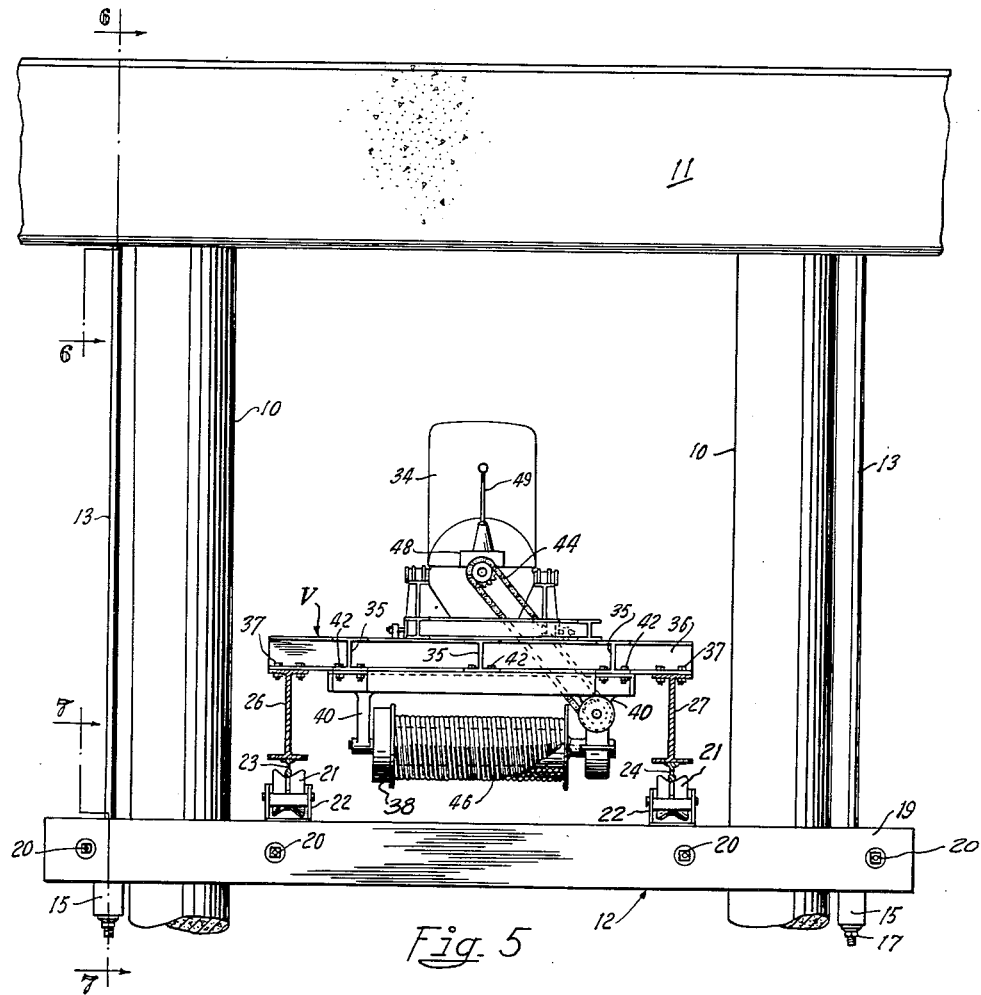

June 26, 1956
J. B. TEMPLETON
2,751,853
TRANSPORTATION SYSTEMS
Filed Dec. 4, 1950
3 Sheets-Sheet 1
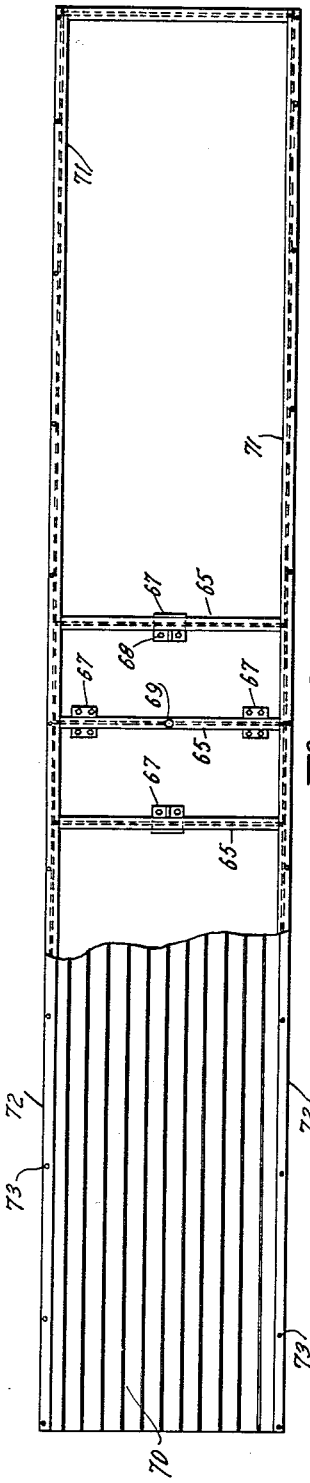
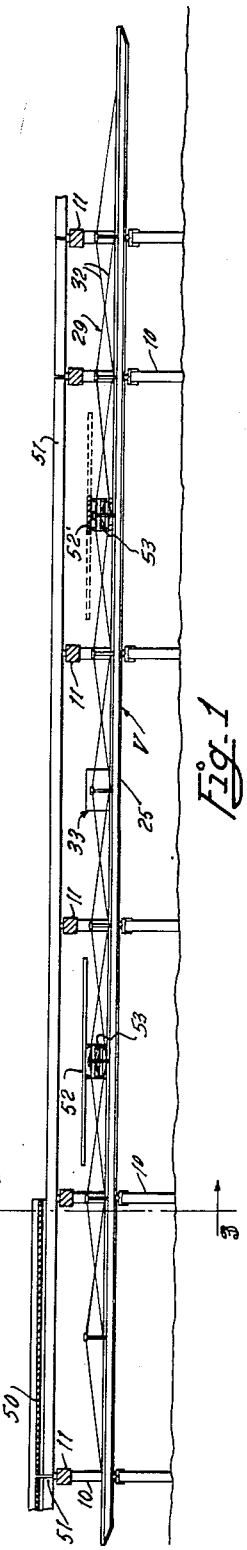
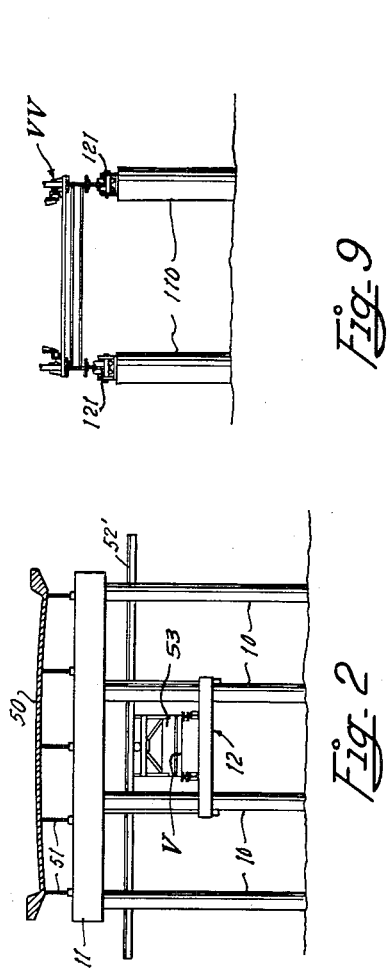
JOHN B. TEMPLETON
INVENTOR.
BY
ATTORNEY

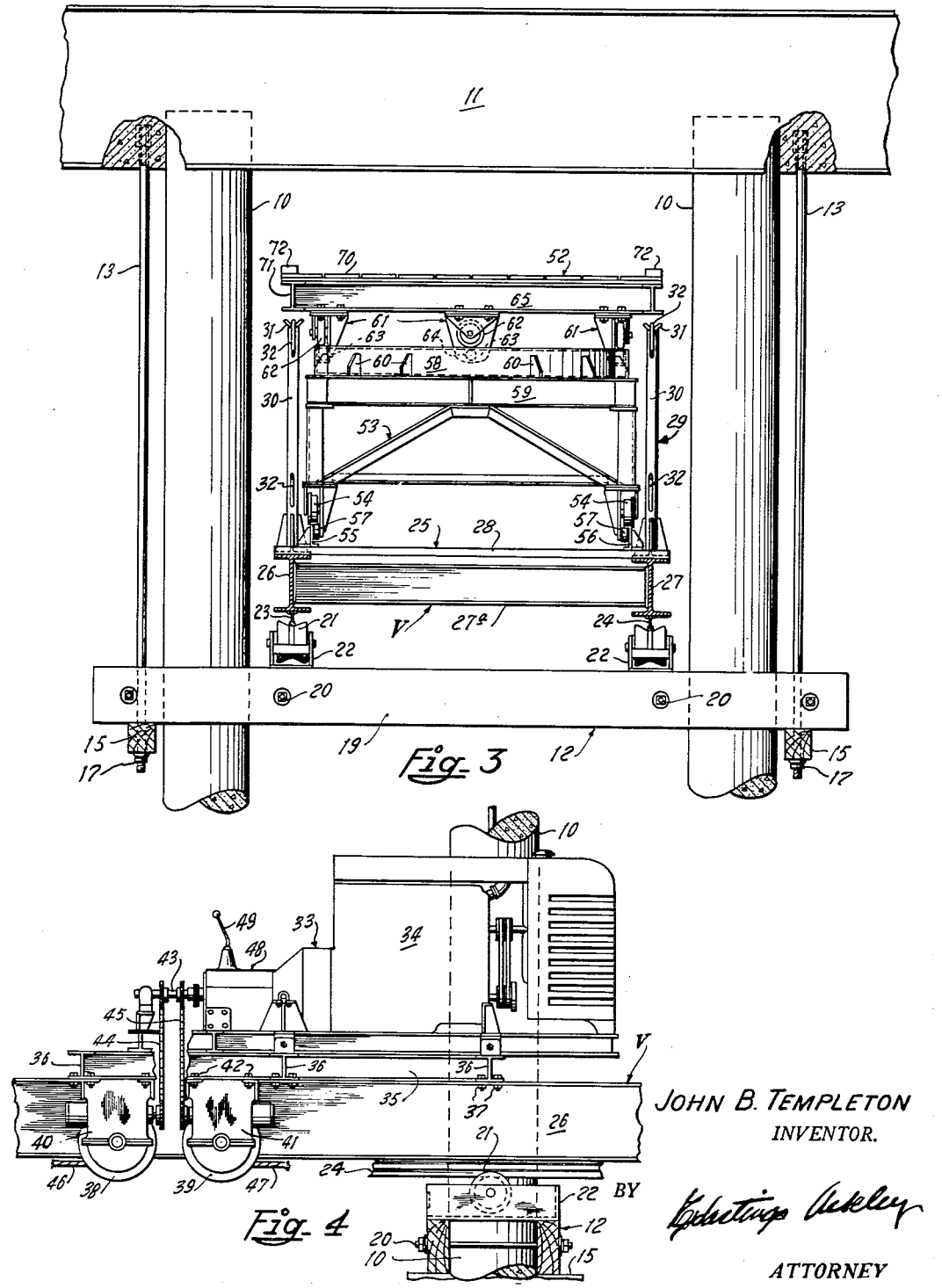

June 26, 1956     J. B. TEMPLETON     2,751,853
TRANSPORTATION SYSTEMS
Filed Dec. 4, 1950     3 Sheets-Sheet 3

JOHN B. TEMPLETON
INVENTOR.

BY *Hastings Ashley*

ATTORNEY

United States Patent Office 2,751,853
Patented June 26, 1956

2,751,853

TRANSPORTATION SYSTEMS

John B. Templeton, Dallas, Tex.

Application December 4, 1950, Serial No. 199,102

6 Claims. (Cl. 104—135)

This invention relates to new and useful improvements in transportation systems and more particularly to transportation systems having vehicles for travel over supporting structures which do not provide a continuous load supporting surface.

In many applications, such as the construction of bridges, vehicles must be employed to transport materials and men from one point to another between supporting structures over terrain or water which does not provide a suitable continuous load supporting surface between the two points. The bridging of the gaps between the supporting structures to provide a continuous load supporting surface, such as a roadway, track, or suspension cable, necessitates the expenditure of considerable quantities of material and much labor. Provision of such continuous load supporting surfaces, which are used only during the construction of the bridge, is uneconomical, and reductions in the cost of materials, labor and time can be effected if a vehicle is employed which can travel over the supporting structures even though a continuous road, track or cable is not constructed to support it during such travel. Moreover, in the construction of bridges or other structures, the vehicle should be provided with a movable working platform to enable the workmen to reach all necessary parts of the bridge while they are carried by the vehicle.

Accordingly, it is one object of the invention to provide a new and improved transportation system which employs a vehicle and support means designed to provide for travel between supporting structures which are not connected with a suitable continuous load supporting surface.

It is another object of the invention to provide a new and improved transportation system wherein the vehicle travels over aligned spaced rollers carried by spaced supporting structures.

Still another object of the invention is to provide a new and improved vehicle for traveling over a plurality of spaced aligned vehicle supporting rollers.

A further object of the invention is to provide a new and improved vehicle of the character described having a movable work platform.

It is still a further object of the invention to provide a new and improved self-propelled vehicle for travel over supporting structures which do not provide a continuous load supporting surface.

Briefly stated, in one embodiment of the invention, a vehicle is provided with a main platform supported on a pair of elongated parallel rails which are rigidly secured to and below the main platform. The rails are adapted to engage the concave peripheral surfaces of parallel rows of spaced aligned rollers rotatably mounted on hanger cross arms hung from the cap beams of a bridge, or supported by other structures. The rails are of sufficient length to distribute the weight of the vehicle over a number of the rollers so that each roller supports only a portion of the weight of the vehicle. A winch is mounted on the work platform to propel the vehicle over the rollers, and has a pair of rotatable drums and a pair of cables which are adapted to wind on the drums as the latter are rotated. The ends of the two cables not fastened to the drums are secured to immovable structures located at opposite ends of the bridge or other structure so that the vehicle may be moved in either direction by rotating one or the other of the drums in a predetermined direction, and the drums are preferably rotated simultaneously, so that as one cable is wound on one drum the other cable is unwound from the other drum. A pair of tracks are fixed to the upper surface of the main platform and carry a wheeled carriage, which has a working platform supported on a turn-table so that the working platform, which must be of relatively narrow width in order to pass through the narrow confines of the bridge structures, may be rotated to extend transversely of the tracks to provide access to the whole width of the bridge structure.

Figure 6:
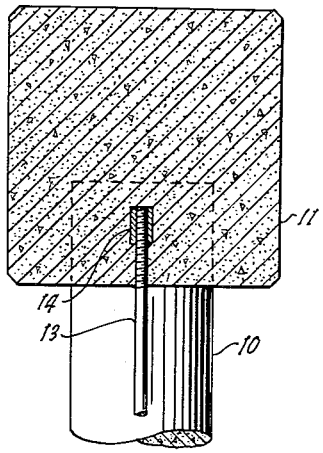
Figure 7:
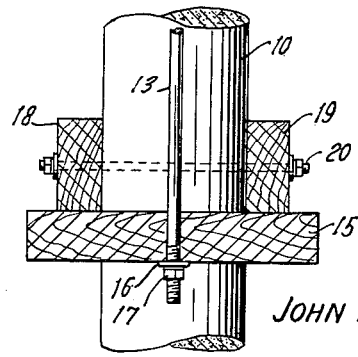

Additional objects and advantages of the invention will readily be apparent from the reading of the following description of a device constructed in accordance with the invention, and reference to the accompanying drawings thereof, wherein:

Figure 1 is a side view of a preferred embodiment of the system in operative position on a bridge structure, with portions of the bridge structure shown in section, Figure 2 is an end view of the system illustrated in Figure 1, Figure 3 is a sectional view taken along the line 3—3 of Figure 1, Figure 4 is a side view of a winch mounted on the vehicle, taken along the line 4—4 of Figure 5, Figure 5 is an end view of the winch illustrated in Figure 4, Figures 6 and 7 are sectional views taken along the lines 6—6 and 7—7 of Figure 5, Figure 8 is a top plan view of a working platform with portions of the platform broken away to reveal the platform frame, and Figure 9 is a view, similar to Figure 2, showing the system mounted on the upper ends of piles.

In the drawings, a preferred embodiment of the invention is illustrated as employed on long spans of a bridge, causeway or the like. The bridge structure comprises a plurality of sets of aligned piles 10 on which are secured transverse cap beams 11. A hanger cross arm 12 is suspended from each of the cap beams by means of hanger rods 13, each of which has an upper threaded end engaging a threaded sleeve 14 embedded in its associated cap beam. A hanger block 15 is mounted on the lower end of each hanger rod by means of a washer 16 and nut 17, the hanger rods extending through suitable apertures in the hanger blocks. Each hanger cross arm 12 has two parallel members 18 and 19 which are disposed on opposite sides of the piles and rest on the hanger blocks 15. Each pair of the parallel hanger members are clamped against their associated piles by bolts 20 which extend through suitable registering apertures in the members.

A pair of rollers 21 is mounted on each across arm 12 by means of brackets 22 which are secured to the cross arms by bolts or any other suitable conventional means. The rollers have concave peripheral surfaces to receive the inverted rails 23 and 24 of a vehicle V and the rollers carried by the various sets of piles are disposed in aligned parallel spaced rows so that the rails will successively engage the rollers on successive cross arms as the vehicle travels along the bridge structure.

The vehicle V includes a main platform 25 which has a pair of parallel longitudinal beams 26 and 27 rigidly connected together by a plurality of transverse beams 27a which are welded or otherwise secured to the longitudinal beams, and a deck 28 of wooden planks or other suitable material is mounted on the longitudinal beams to provide storage areas on which materials and tools may be piled for transport by the vehicle. The inverted rails 23 and 24, which engage the rollers 21, are rigidly secured to the under sides of the longitudinal beams by welding or other suitable means, and the length of the beams and rails is such that a plurality of sets of rollers are engaged by the rails at any one time.

In order to strengthen the main platform 25 of the vehicle, a truss structure 29 is secured to each side of the main platform. Each truss structure has a plurality of spaced upright standards 30 whose lower ends are rigidly secured to the longitudinal beams 26 or 27, as the case may be, by welding, bolts or otherwise, and whose upper ends are provided with channel members 31. Tension rods 32 have their intermediate portions disposed in the channel members 31 and their ends secured to one of the longitudinal beams 26 or 27 through turnbuckles (not shown) or other tensioning means.

It will be apparent that the vehicle can be moved from one end of the bridge structure to the other, since the longitudinal beams 26 and 27 and rails 23 and 24 are sufficiently long to span several of the hanger cross arms 26. At all times during the travel of the vehicle, therefore, each of the rails will rest on a plurality of the rollers 21 and, as the vehicle moves, the rails will engage new rollers as they disengage from the rollers which supported the vehicle during the preceding portion of the travel of the vehicle. The weight of the vehicle and of its load is at all times borne by a plurality of the rollers and cross arms or other supporting structure so that considerable loads may be carried by the vehicle.

The vehicle may be provided with a self propelling means such as a winch assembly 33 mounted on the longitudinal beams 26 and 27. The winch assembly shown comprises a conventional gasoline motor 34 mounted on a supporting platform made of longitudinal beams 35 which are rigidly secured to transverse beams 36 by welding, riveting or otherwise. The transverse beams are secured to the longitudinal beams 26 and 27 of the main platform 25 by bolts 37, or otherwise.

A pair of drums 38 and 39 are rotatably mounted in brackets 40 and 41, respectively, which in turn are mounted on the beams 35 and 36 of the supporting platform by means of bolts 42, or the like. The drums are connected to the driving shaft 43 of the motor by means of chain and sprocket drives 44 and 45, respectively. The drums rotate in opposite directions when driven by the motor so that the cable 46 is unwound from the drum 38 whenever the cable 47 is wound on the other drum 39, and vice versa. The ends of the cables not connected to the drums are secured to fixed structures or anchors at opposite ends of the bridge structure so that the vehicle may be moved in either direction by selective clockwise or counterclockwise rotation of the drive shaft 43. The direction of rotation of the drive shaft is controlled by a conventional transmission 48 operated by the shift lever 49.

The piles 10 and cap beams 11 are employed as supports for I-beams 51 upon which is cast a concrete bridge floor or roadway 50. The I-beams span and rest upon the cap beams. Since the roadway 50 is on a higher level than the main platform 25 of the vehicle V, and since it is considerably wider than the main platform, workmen standing on the main platform do not have access to all parts of the roadway and to the forms in which the sections of the roadway are cast, when such forms are in place on the I-beams.

A working platform 52, rotatably mounted on a movable carriage 53, is provided on the vehicle so the workman may stand on such platform and have access to all parts of the roadway and forms while working on the construction thereof.

The carriage 53 is constructed of metal beams and is provided with a plurality of rotatable flanged wheels 54 which engage and rest upon spaced parallel flanged tracks 55 and 56 rigidly secured to the upper surface of the main platform 25 of the vehicle. The tracks extend substantially to the ends of the main platform from points adjacent the opposite ends of the winch assembly 33. A plurality of retaining rollers 57, rotatably mounted on suitable brackets secured to the carriage, are employed to prevent the carriage from jumping the tracks. Each of the retaining rollers is disposed beneath one of the wheels 54 and on the opposite side of the flange of the track from the side on which said wheel is resting. A flanged circular rail 58 is rigidly secured to the top members 59 of the carriage and has a plurality of outwardly radiating buttresses 60.

The working platform 52 is provided with a plurality of downwardly extending brackets 61 arranged along the periphery of a circle of substantially the same radius of the circular rail 58, and a wheel 62 is rotatably mounted in each bracket and rides on top of the flange of the circular rail. Each of the brackets is also provided with a projection or spur 63 which extends downwardly past and beneath the flange of the circular rail and has a small retaining roller 64 engageable with the underside of the circular rail to prevent displacement of the working platform off said circular rail. The brackets 61 are secured to transverse I-beams 65 of the working platform 52 by means of plates 67 (Figure 8) which are welded to the I-beams and which are connected to the brackets by bolts 68, or the like. The working platform is also rotatably secured to the carriage by a center bolt 69 which passes through suitable registering apertures in the central beam 65 and the top frame member 59 of the carriage.

The working platform has a deck 70 formed of two layers of wooden planks which are shown as secured to a rectangular frame 71 by means of runners 72 and carriage bolts 73 which extend through registering apertures in the frame, the deck and the runners.

When the vehicle V or the carriages 53 are moved longitudinally between the piles 10 to a desired working place on the bridge structure, the work platforms 52 are maintained in the position shown in Figure 3, with the longitudinal axes of the work platforms and the main platform parallel to one another. Once the working platform is located at the desired working place, it is rotated about the center bolt 69 and on the circular flange rail 58 until it extends transversely of the bridge, as indicated by the working platform 52' of Figures 1 and 2. The workmen on the platform then have access to the roadway 50 from one side to the other, and are easily able to put up and remove the concrete forms which are used for forming the roadway.

Since the carriages 53 are movable on the main platform 25 of the vehicle, several working platforms may be used on each vehicle, and each working platform can be moved independently of the other. The areas of the main platform 25 adjacent to the working platforms may be employed to store tools and materials used in constructing the bridge, if desired. A winch assembly 33 may be provided on each vehicle along with one or more working platforms so that the location of the vehicle and the working platforms can be readily controlled by the workmen on the vehicle.

The vehicle illustrated in the drawings is shown in Figures 1 through 7 to be traveling on rollers 21 mounted on cross arms 12 suspended from cap beams 11 mounted on the tops of the piles 10 of a bridge or causeway. In some applications, the rollers 21 may be mounted directly on the upper sides of the cap beams or on the tops of the piles shown, or on temporary piles, so that the vehicle will travel above the piles.

In Figure 9, the rollers 121 are shown to be mounted on the upper ends of pairs of spaced piles 110, and the vehicle VV as riding upon such rollers above the tops of the piles. This arrangement is suitable for use in conveying or transporting material or equipment to offshore marine drilling installations and the like, where erection of a bridge or causeway would be prohibitive in cost and impossible as an obstruction to navigation.

The vehicle may support other devices than the working platforms shown. For example, donkey engines and cranes may be mounted on the main platform in order that they may be moved over the piles to locations where the donkey engine and crane are needed.

It will readily be seen that the transportation system will operate between structures not provided with a continuous connecting supporting surface. Materials, machines and men can be transported by means of the described vehicle along bridges, causeways or the like structures by merely mounting a plurality of aligned rollers on the structures along the desired path of travel of the vehicle. It will be readily apparent that it is much more economical to mount a plurality of rollers on the structures than to lay a continuous track or roadway, and a single vehicle may be repeatedly used on successive installations. The rotatable mounting of the working tables allows them to be moved through the narrow confines of the bridge structures and the like and still permits the platforms to be so positioned as to extend transversely beyond the sides of the bridge.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A transportation system comprising: a plurality of widely spaced sets of aligned piles, the piles of each set of piles being aligned laterally of two spaced parallel rows of piles; a cap beam on each set of piles; a cross arm suspended from each cap beam; a pair of rollers rotatably mounted on each of said cross arms, the rollers on the cross arms being aligned in two spaced parallel rows, and a vehicle having a main platform and a pair of rails secured to and beneath the main platform in spaced parallel relationship to one another, one of said rails engaging the rollers of one of the rows and the other of said rails engaging the rollers of the other of the rows during the movement of said vehicle, said vehicle being supported on said rollers.

2. In the transportation system of claim 1, a pair of parallel spaced tracks mounted on the main platform, said pair of tracks being parallel to said rails, a carriage movably mounted on the tracks, and an elongate working platform of greater length than said cross arms rotatably mounted on the carriage, said main and working platforms lying in parallel planes, the working platform being rotatable about an axis perpendicular to said planes whereby said working platform may be positioned transversely of said main platform to extend laterally outwardly of said cross arms and between the piles of adjacent sets of piles.

3. In the transportation system of claim 1, each of said cross arms comprising a pair of parallel members disposed on opposite sides of piles of each set of piles, and means rigidly securing said parallel members to one another whereby movement of said cross arms longitudinally of said rows of piles is prevented.

4. A transportation system including: a plurality of spaced rollers rotatably secured to widely spaced separate supporting structures in two parallel spaced rows, said supporting structures being spaced from one another longitudinally of said rows; and a vehicle comprising a main platform, a pair of rails secured to and beneath the main platform in spaced parallel relationship to one another, one of the rails engaging rollers of one of the rows and the other of the rails engaging rollers of the other of the rows, each of the rails at all times engaging a plurality of the rollers in its respective row and being supported thereby, means mounted on the main platform for moving the vehicle over the rollers, and an elongate working platform of greater length than the space between the rows of supporting structures rotatably mounted on the main platform, said main platform and said working platform lying in parallel planes, said working platform being rotatable about an axis perpendicular to said planes whereby said working platform may be positioned transversely of said main platform and between an adjacent pair of said supporting structures to extend laterally outwardly of said supporting structures.

5. A transportation system including: a plurality of spaced rollers rotatably secured to widely spaced separate supporting structures in two parallel spaced rows, said supporting structures being spaced from one another longitudinally of said rows; and a vehicle comprising a main platform, a pair of rails secured to and beneath the main platform in spaced parallel relationship to one another, one of the rails engaging rollers of one of the rows and the other of the rails engaging rollers of the other of the rows, each of the rails at all times engaging a plurality of the rollers in its respective row and being supported thereby, means mounted on the main platform for moving the vehicle over the rollers, a carriage mounted on the main platform for movement parallel to the longitudinal axis of the main platform, and an elongate working platform of greater length than the lateral space between said supporting structures rotatably mounted on the carriage, said main platform and said working platform lying in parallel planes, said working platform being rotatable about an axis perpendicular to said planes whereby said working platform may be positioned transversely of said main platform and between an adjacent pair of said supporting structures to extend laterally outwardly of said supporting structures.

6. A transportation system comprising: a plurality of widely spaced rollers rotatably secured to separate supporting structures in two parallel spaced rows, said supporting structures being spaced from one another longitudinally of said rows; a vehicle having a main platform and a pair of rails secured to and beneath the main platform in spaced parallel relationship to one another, one of said rails engaging the rollers of one of the rows and the other of said rails engaging the rollers of the other of the rows, said rails at all times engaging some of said rollers and being supported thereby; a carriage mounted on the main platform for movement parallel to the longitudinal axis of said main platform; and an elongate working platform of greater length than the space between said supporting structures rotatably mounted on the carriage, said main platform and said working platform lying in parallel planes, the working platform being rotatable about an axis perpendicular to said planes whereby said working platform may be positioned transversely of said main platform and between an adjacent pair of supporting structures to extend laterally outwardly of said supporting structures.

References Cited in the file of this patent

UNITED STATES PATENTS

| Number | Name | Date |
|---|---|---|
| 160,831 | Lotz | Mar. 16, 1875 |
| 228,055 | Gilbert | Mar. 25, 1880 |
| 283,947 | Augspath | Aug. 28, 1883 |
| 555,081 | Emond | Feb. 25, 1896 |
| 1,431,699 | Schnable et al. | Oct. 10, 1922 |
| 1,624,064 | O'Neill | Apr. 12, 1927 |
| 1,663,832 | Flynn | Mar. 27, 1928 |
| 1,749,324 | Craig | Mar. 4, 1930 |
| 1,791,663 | Edson | Feb. 10, 1931 |
| 1,838,823 | Gillespie | Dec. 29, 1931 |
| 1,849,470 | Wheelock | Mar. 15, 1932 |
| 2,269,630 | Marinello | Jan. 13, 1942 |
| 2,286,119 | Sloane | June 9, 1942 |
| 2,321,253 | Schellentrager | June 8, 1943 |

FOREIGN PATENTS

| Number | Country | Date |
|---|---|---|
| 187,896 | Great Britain | Nov. 2, 1922 |